US011192714B2

United States Patent
Gathman et al.

(10) Patent No.: US 11,192,714 B2
(45) Date of Patent: Dec. 7, 2021

(54) SILO SYSTEM AND BULK MATERIAL MANAGEMENT SYSTEM

(71) Applicant: SUPERIOR BULK, INC., Mayer, AZ (US)

(72) Inventors: Corey Gathman, Mesa, AZ (US); Bill Jondahl, Phoenix, AZ (US); Gary Curtis, Phoenix, AZ (US); Jeremy Jondahl, Mesa, AZ (US); Joel Jondahl, Mesa, AZ (US); Brad Belt, Glendale, AZ (US)

(73) Assignee: SUPERIOR BULK, INC., Mayer, AZ (US)

( * ) Notice: Subject to any disclaimer, the term of this patent is extended or adjusted under 35 U.S.C. 154(b) by 0 days.

(21) Appl. No.: 16/375,789

(22) Filed: Apr. 4, 2019

(65) Prior Publication Data
US 2019/0308806 A1   Oct. 10, 2019

Related U.S. Application Data

(60) Provisional application No. 62/652,863, filed on Apr. 4, 2018.

(51) Int. Cl.
*B65G 67/24*   (2006.01)
*B65D 88/54*   (2006.01)
(Continued)

(52) U.S. Cl.
CPC ............ *B65D 88/548* (2013.01); *B65D 90/14* (2013.01); *B65D 90/48* (2013.01)

(58) Field of Classification Search
CPC ........ B65G 53/12; B65G 53/14; B65G 47/20; B65G 67/24; B65G 2814/02;
(Continued)

(56) References Cited

U.S. PATENT DOCUMENTS 3,866,770 A * 2/1975 Palmer .................... B60P 1/38
                                                    414/520
4,247,228 A * 1/1981 Gray ........................ B60P 1/04
                                                    406/109
(Continued)

FOREIGN PATENT DOCUMENTS

| CN | 202670685 U | 1/2013 |
| EP | 0803714 A2 | 10/1997 |
| KR | 101374081 B1 | 3/2014 |

OTHER PUBLICATIONS

Silotrack Cloud Remote Inventory Management System—Monitor Technologies, LLC, http://www.feedandgrain.com/product/silotrack-cloud-remote-inventory-management-system, retrieved Mar. 12, 2019, 3 pages.
(Continued)

*Primary Examiner* — Joseph A Dillon, Jr.
(74) *Attorney, Agent, or Firm* — Quarles & Brady LLP

(57) ABSTRACT

A silo system includes a storage chamber, an intake pathway associated with the chamber, and a discharge pathway associated with the chamber. The system further includes one or more material sensors associated with the chamber, a plurality of actuators, and a controller that is communicatively coupled to the one or more material sensors and to the one or more actuators. The plurality of actuators enable a deposit of additional material from a transport container into the chamber through the intake pathway at least partially simultaneous with a discharge of material from the chamber through the discharge pathway into an operational silo. The material sensors provide indications of the amount of bulk material in the chamber and the controller is configured to control the one or more actuators in response to sensor data from the one or more material sensors to provide for deposit of material simultaneous with discharge of material.

9 Claims, 11 Drawing Sheets

(51) Int. Cl.
*B65D 90/48* (2006.01)
*B65D 90/14* (2006.01)

(58) Field of Classification Search
CPC ...... B65G 2814/0302; B60P 1/60; B60P 1/62; B60P 1/36; B60P 1/365; B60P 1/38; B60P 1/40; B60P 1/42; B60P 3/2245; B60P 3/228; B65D 88/548; B65D 2590/0083
USPC ...... 406/12, 24, 39, 40, 41, 42, 43, 44, 124, 406/125, 126; 414/507, 526, 528
See application file for complete search history.

(56) References Cited

U.S. PATENT DOCUMENTS

| | | | | |
|---|---|---|---|---|
| 4,449,861 A * | 5/1984 | Saito | ................ | B65G 51/02 406/144 |
| 4,907,933 A * | 3/1990 | Kressly | ................ | B65G 47/82 414/334 |
| 5,341,856 A * | 8/1994 | Appenzeller | ........ | B65G 53/28 141/231 |
| 5,346,352 A * | 9/1994 | Ito | ................ | B23Q 7/1442 198/718 |
| 5,351,725 A | 10/1994 | Suthergreen et al. | | |
| 5,482,425 A * | 1/1996 | Podd, Jr. | ................ | B60P 1/38 220/1.6 |
| 6,064,311 A | 5/2000 | Ferenczi et al. | | |
| 6,158,926 A * | 12/2000 | Precetti | ................ | B65F 1/127 100/100 |
| 6,343,896 B1 * | 2/2002 | Goodier | ................ | B60P 1/60 406/198 |
| 6,366,829 B1 | 4/2002 | Wallace | | |
| 6,447,215 B1 * | 9/2002 | Wellmar | ................ | B65G 53/66 406/11 |
| 6,454,496 B1 * | 9/2002 | Mills | ................ | B60P 1/60 406/146 |
| 6,554,546 B2 * | 4/2003 | Dunlop | ................ | B60P 1/60 406/197 |
| 8,079,245 B1 | 12/2011 | Owens et al. | | |
| 8,656,693 B2 * | 2/2014 | Madsen | ................ | B65G 67/32 56/10.2 R |
| 9,961,877 B1 * | 5/2018 | Aulick | ................ | B01F 15/00194 |
| 10,150,400 B2 * | 12/2018 | Wood | ................ | B60P 1/36 |
| 2002/0107645 A1 | 8/2002 | Uzzo et al. | | |
| 2003/0217596 A1 | 11/2003 | Dirksen | | |
| 2006/0015543 A1 | 1/2006 | Humphrey | | |
| 2006/0056924 A1 * | 3/2006 | Jurkovich | ................ | B65G 53/66 406/39 |
| 2008/0283142 A1 * | 11/2008 | Steffi | ................ | F23K 3/02 141/2 |
| 2009/0288482 A1 | 11/2009 | Faist | | |
| 2009/0290970 A1 * | 11/2009 | Farley | ................ | A01D 41/1217 414/808 |
| 2011/0162838 A1 * | 7/2011 | Mackenzie | ............ | B63B 27/29 166/267 |
| 2012/0204978 A1 | 8/2012 | Ozâmiz Fortis | | |
| 2013/0211658 A1 * | 8/2013 | Bonefas | ................ | B65G 67/24 701/28 |
| 2015/0239384 A1 * | 8/2015 | Meier | ................ | B60P 1/42 414/489 |
| 2015/0264866 A1 * | 9/2015 | Foster | ................ | A01D 41/1217 414/21 |
| 2015/0313080 A1 * | 11/2015 | Matousek | ............ | A01D 61/008 414/468 |
| 2016/0152421 A1 * | 6/2016 | Bawri | ................ | B65G 67/20 414/298 |
| 2017/0190523 A1 * | 7/2017 | Oren | ................ | B65G 53/26 |
| 2017/0327326 A1 | 11/2017 | Lucas et al. | | |
| 2018/0111538 A1 * | 4/2018 | Detter | ................ | B60P 1/42 |
| 2019/0061593 A1 * | 2/2019 | Harper | ................ | G06Q 10/087 |
| 2019/0100391 A1 * | 4/2019 | Managan, II | ........ | B65G 67/24 |
| 2019/0218045 A1 * | 7/2019 | Thomson | ........... | A01D 41/1217 |
| 2019/0308825 A1 * | 10/2019 | Ge | ................ | B65G 15/00 |
| 2019/0322461 A1 * | 10/2019 | Banthia | ................ | B60P 1/42 |
| 2020/0125109 A1 * | 4/2020 | Velten | ................ | G05D 1/0225 |
| 2020/0255235 A1 * | 8/2020 | Ruhland | ................ | B65G 69/006 |
| 2020/0324985 A1 * | 10/2020 | Posselius | ........... | A01C 23/045 |
| 2020/0394608 A1 * | 12/2020 | Trim | ................ | B65G 67/24 |

OTHER PUBLICATIONS

Shapiro, Vladimir "Three Ways Companies are Improving Silo Management with IOT", https://westernacher-consulting.com/three-ways-companies-improving-silo-management-iot/, retrieved Mar. 14, 2019; 4 pages (Sep. 6, 2018).

Graves et al., "Inventory Management Method and Apparatus", U.S. Statutory Invention Registration No. H1743, published Aug. 4, 1998, 20 pages.

* cited by examiner

SILO SYSTEM AND BULK MATERIAL MANAGEMENT SYSTEM

CROSS-REFERENCE TO RELATED APPLICATION

This application claims the benefit of and priority to U.S. Provisional Patent Application Ser. No. 62/652,863, filed Apr. 4, 2018, for "Smart Portable Silo", the entire disclosure of which is incorporated herein by reference

TECHNICAL FIELD

The present disclosure relates generally to the storage and transport of bulk materials, and more particularly, to a silo system that enables the simultaneous deposit of material into and discharge of material from a storage chamber, and a bulk material management system that automatically confirms the deposit of additional material into a silo using real-time sensor data.

BACKGROUND

Distribution and delivery of bulk materials, such as powders, including but not limited to cement, fly ash, and lime, from suppliers to consignees is done using delivery trucks. Consignees may be, for example, ready-mix concrete producers, concrete block manufacturers, cement bagging plants, etc. Consignees generally require a continuous supply of bulk material and accordingly maintain an operational silo for on-site storage of an inventory of bulk materials. Typical inventory turnover for a consignee might be one half to one silo per-day, but even faster turnover may be possible.

Bulk material is typically provided to a consignee by a bulk material hauler that delivers bulk material by truck. The bulk material hauler operates as an intermediary between the supplier or manufacturer of the bulk material and the consignee. That is, the supplier, the consignee, or both may be customers of the bulk material hauler. A typical truck for the delivery of bulk material has a pneumatic transport container or tank that carries the bulk material and a hose for connecting to an onsite storage facility, which may be in the form of an on-site operational silo. These delivery trucks may also be equipped with an air compressor or blower for use in transporting material from the pneumatic transport container to the operational silo.

In a conventional delivery of a bulk material to a consignee site, upon arrival at the site, an operator of the delivery truck connects the hose of the pneumatic transport container to a corresponding intake tube associated with the operational silo. If the truck is equipped with an air compressor or blower, the operator may hook the hose to a blower. Alternatively, the consignee may have an external blower on site that may be used. The operator then opens a valve on the pneumatic transport container and the material discharges out of the container, through the hose and into the operational silo. Aeration lines aerate the material as it passes through the discharge tubes to stir the material for flow through the tube.

In some instances, all operational silos at a consignee site may be at capacity when a delivery truck arrives on site. When this occurs, the delivery truck may be delayed until adequate space is freed up in the operational silo or, alternately, the material in the truck tank may have to be discharged into a temporary storage tank on site. For example, consignees, shippers and/or bulk material haulers may provide temporary storage at a consignee's site in the form of a "guppy" or "pig," which is a horizontal storage tank operating under pressure and pneumatic discharge similar to the pneumatic transport containers used in bulk hauling.

Several problems arise from these conventional bulk material delivery and on-site storage models. For example, consignees that require a large amount of on-site fixed storage of bulk material encounter high costs both in terms of capital investment (e.g., operational silo costs) and continued operating costs. These consignees are also faced with large physical space requirements that are associated with the provision of sufficient on-site fixed storage capacity.

The portable horizontal storage tanks, i.e., a guppy or pig, mentioned above have certain disadvantages. For example, to move material from a guppy or pig to an on-site operational silo, requires a pressure source and manual operation similar to the steps described above for unloading a pneumatic transport container of a truck. Such a process generally requires an operator to manage the process, increasing labor costs and creating added safety issues for the consignee. The process also prevents the discharge of new material into the guppy or pig while material is being transferred out of it. Furthermore, portable horizontal storage tanks have large footprints relative to their storage capacity.

Conventional bulk material delivery models have inherent sources of slowing or delay. For example, long discharge times are required to transfer a container of bulk material to an operational silo because of the sizes of discharge tubes and hoses. Also, additional wait times may be associated with the unloading or deposit of bulk material from a pneumatic transport container into an operational silo if bulk material currently in that operational silo is being unloaded or discharged into the consignee plant. Because pneumatic deposit of bulk material into an operational silo can force too-fast discharge of bulk material from the operational silo into the consignee site, the material-deposit operation is often performed separate from the material discharge operation.

Additional sources of inherent delay in conventional bulk material delivery models arise from long transportation times from the supplier to the consignee due to unpredictable events such as traffic delays, road closures or truck breakdowns. If the consignee doesn't order additional material before depleting its inventory, production may need to stop while waiting for hauler to refill the silo. The consignee's operation can generally deplete material in its operational silo much more quickly than the hauler can replace it, preventing inventory from "catching up" during high demand periods.

While the foregoing has focused on inefficiencies faced by consignees under conventional bulk material delivery schemes, the bulk material hauler faces its own inefficiencies. For example, the demand for bulk material by an individual consignee may be unpredictable due to short-notice cancellations of projects for the consignee, changes in weather that result in work stoppage by the consignee, equipment breakdowns, or schedule changes. There may be unpredictability in the demand for bulk material from consignee groups whose locations may be located far from one another, making diversions or re-routing of deliveries difficult and time-consuming. The overall demand for transportation of bulk materials is seasonal in some geographic regions and subject to other very difficult-to-predict variables; thus, demand may vary greatly over time and is usually concentrated in short windows of "rush hours" at particular times of day and days of the week. Filling an operational silo faster than a consignee consumes inventory usually requires multiple trucks simultaneously delivering material to a single consignee site, which often is not possible due to congested space for truck parking, limited connection points and/or limits on the air volume or pressure that may be imparted on the operational silo. Finally, the downstream product produced with these bulk materials is usually ready mixed concrete delivered to an active construction site with a very short window of workability. Because the ready mixed concrete cannot be produced without these bulk materials, the possibility that a consignee may reduce or stop production of its products due to stockout of bulk materials is very real, and the cost of such a shortfall in the middle of a concrete placement can be very high.

In view of the foregoing, bulk material hauling operations are in need of improvements. For example, a silo system that allows for simultaneous pressurized deposit into and pressurized discharge from an operational silo in a manner that reduces or avoids disruptive pneumatic effects, such as uneven or uncontrollable flow of material during discharge, would improve operational efficiencies. Also, a silo system that enables real-time verification of a deposit of material at an operational silo would benefit bulk material management operations. The concepts disclosed below provide these improvements.

SUMMARY

An aspect of the disclosure relates to a silo system that enables simultaneous deposit and discharge of bulk material without one operation affecting the other. The silo system includes a storage chamber, an intake pathway associated with the storage chamber and configured to be pressurized by a pneumatic source, and a discharge pathway associated with the storage chamber and configured to be pressurized by a pneumatic source. The silo system further includes one or more material sensors associated with the storage chamber, a plurality of actuators, and a controller that is communicatively coupled to the one or more material sensors and to the one or more actuators. The plurality of actuators enable a deposit of additional material from a transport container into the storage chamber through a pressurized intake pathway at least partially simultaneous with a discharge of material from the storage chamber through a pressurized discharge pathway into an operational silo. The material sensors provide indications of the amount of bulk material in the storage chamber and the controller is configured to control the one or more actuators in response to sensor data from the one or more material sensors to thereby provide for deposit of material at least partially simultaneous with discharge of material.

In conventional bulk material silo systems, due to potentially competing pneumatic effects at the deposit and discharge ends of a silo, bulk material cannot be deposited into a silo while material is being controllably discharged from the silo. For example, in a conventional silo system where material is discharged by gravity alone, the pneumatic effect provided by a blower at the deposit end may enter the silo, reach the discharge end and interfere with the flow of discharging material. This especially occurs in cases where the operational silo is empty or the level of material in the silo is too low to provide a barrier between the incoming pressurized air and the discharge port. The pneumatic isolation between the discharge pathway and the intake pathway provided by disclosed silo system, however, eliminates this pneumatic interference regardless of the level of material in the storage chamber, and allows for the simultaneous deposit/discharge of bulk material at a silo. This capability of the disclosed silo system eliminates the need to wait for the end of material discharge before commencing material deposit and thus significantly reduces the time it takes to complete delivery of bulk material to a silo. At least partially simultaneous in this context does not require that material deposit and material discharge always occur together. Rather, it means that the for a portion of time during which deposit is occurring, discharge is also occurring or vis versa.

Another aspect of the disclosure relates to a bulk material management system for use with a first silo storing a material. The system includes one or more material sensors configured to be associated with the first silo, and one or more verification sensors configured to be associated with one or more of the first silo and a transport container (or truck carrying the transport container). The material sensors generate real-time material data that relate to a presence of material in the first silo, while the one or more verification sensors generate real-time verification data related to a deposit of additional material from a transport container into the first silo. The system further includes a processor configured to receive the real-time verification data and to process the real-time verification data to confirm the deposit of additional material from the transport container into the first silo. The system may further include a communication interface communicatively coupled to the processor for communicating the real-time verification data to an application server.

In conventional bulk material management systems, there is no automated, real-time confirmation or verification of a delivery of bulk material to a silo. Instead, a delivery to a site is manually confirmed by an operator of the material hauler, e.g., truck driver, upon arrival at a site by, for example, obtaining written signature on a paper bill of lading, scanning a material receipt or sending an electronic communication to the consignee, shipper and/or material hauler. While these conventional systems may confirm the arrival of the bulk material at the silo, they fail to confirm that the material was actually deposited into the silo. The verification sensors and processor of the disclosed bulk material management system, however, enables automated, real-time confirmation that a bulk material has not only arrived at a site, but has been deposited into a silo.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of systems and methods will now be presented in the detailed description by way of example, and not by way of limitation, with reference to the accompanying drawings, wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 1A:
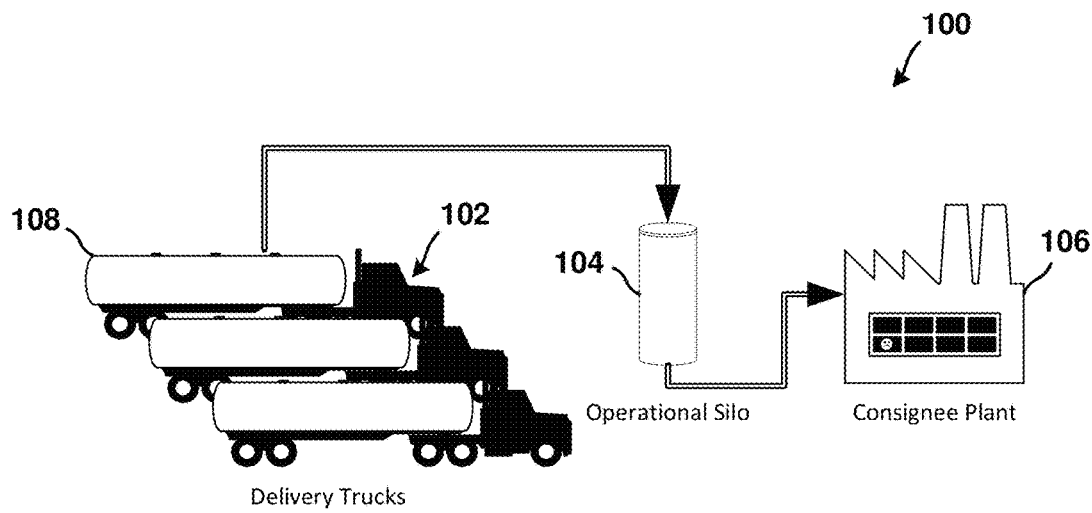
FIG. 1A is a schematic illustration of a conventional model for hauling bulk material to a consignee location or site.

With reference to FIG. 1A, a conventional model for hauling bulk material to a consignee site 100 involves the transport of bulk material by a bulk material hauler using one or more delivery trucks 102 carrying a transport container 108 in the form of a tank. Once at the consignee site 100, the bulk material is transferred from the transport container 108 to an operational silo 104, where it is stored until needed by a consignee factory or plant 106 at that consignee site 100. The operational silo 104 is typically owned by the consignee and integrated into its plant 106. Typically, bulk material is fed from the operational silo 104 to a weigh bin in the plant 106.

Figure 1B:
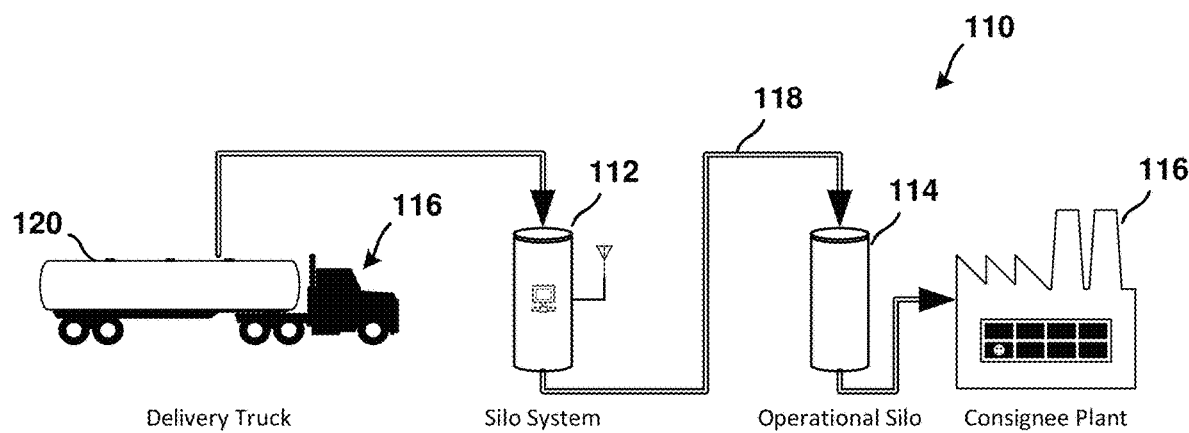
FIG. 1B is a schematic illustration of a storage-first model for hauling bulk material to a consignee location or site according to certain aspects of this disclosure.

With reference to FIG. 1B, in accordance with aspects of this disclosure, a "storage-first" model for hauling bulk material to a consignee site 110 involves the use of one or more silo systems 112 in conjunction with one or more operational silos 114. The silo system 112 is owned by the material hauler and may be portable and thus deliverable on site at the consignee site 110. In a portable embodiment, the silo system 112 is configured for rapid loading and unloading and may be erected in a manner that allows for subsequent relocation. In this embodiment, a material hauler delivers the silo system 112 to the consignee site 110 and erects it and connects a discharge pathway 118 of the silo system to an operational silo 114. In operation, the silo system 112 may be semi-permanent, e.g., remaining at the same consignee site 110 for an extended period of time. However, if the consignee's order changes or terminates, if the hauler needs the storage capacity at a different consignee site, or for any other reason, the hauler may disconnect the silo system 112 from the operational silo 114 and relocate it as needed. The operational silo 114 is typically owned by the consignee and integrated into its factory or plant 116. Typically, bulk material is fed from the operational silo 104 to a weigh bin in the plant 116.

The silo system 112 acts as an inventory buffer and provides the consignee site 110 with additional storage capacity. By adding storage at the consignee site, the consignee's inventory turnover can be increased. For example, if storage were doubled, inventory turnover might potentially double. Conversely, at the same demand volume, doubling the consignee's storage would double the consignee's effective days of available inventory and double the time in between required material deliveries.

In an aspect of the present disclosure, the silo system 112 includes a combination of features that, when combined together, provide faster speed for various operations that involve the silo. Accordingly, when combined, these features described below can improve efficiency and reduce costs for all involved parties, including the shipper, the hauler, and the consignee.

Continuing with FIG. 1B, similar to the conventional model, the storage-first model involves the transport of bulk material by a bulk material hauler using a delivery truck 117 carrying a transport container 120 in the form of a tank. Once at the consignee site 110, the bulk material is transferred from the transport container 120 to a silo system 112, where it is stored until an operation silo 114 associated with the silo system requires additional material.

Figure 2:
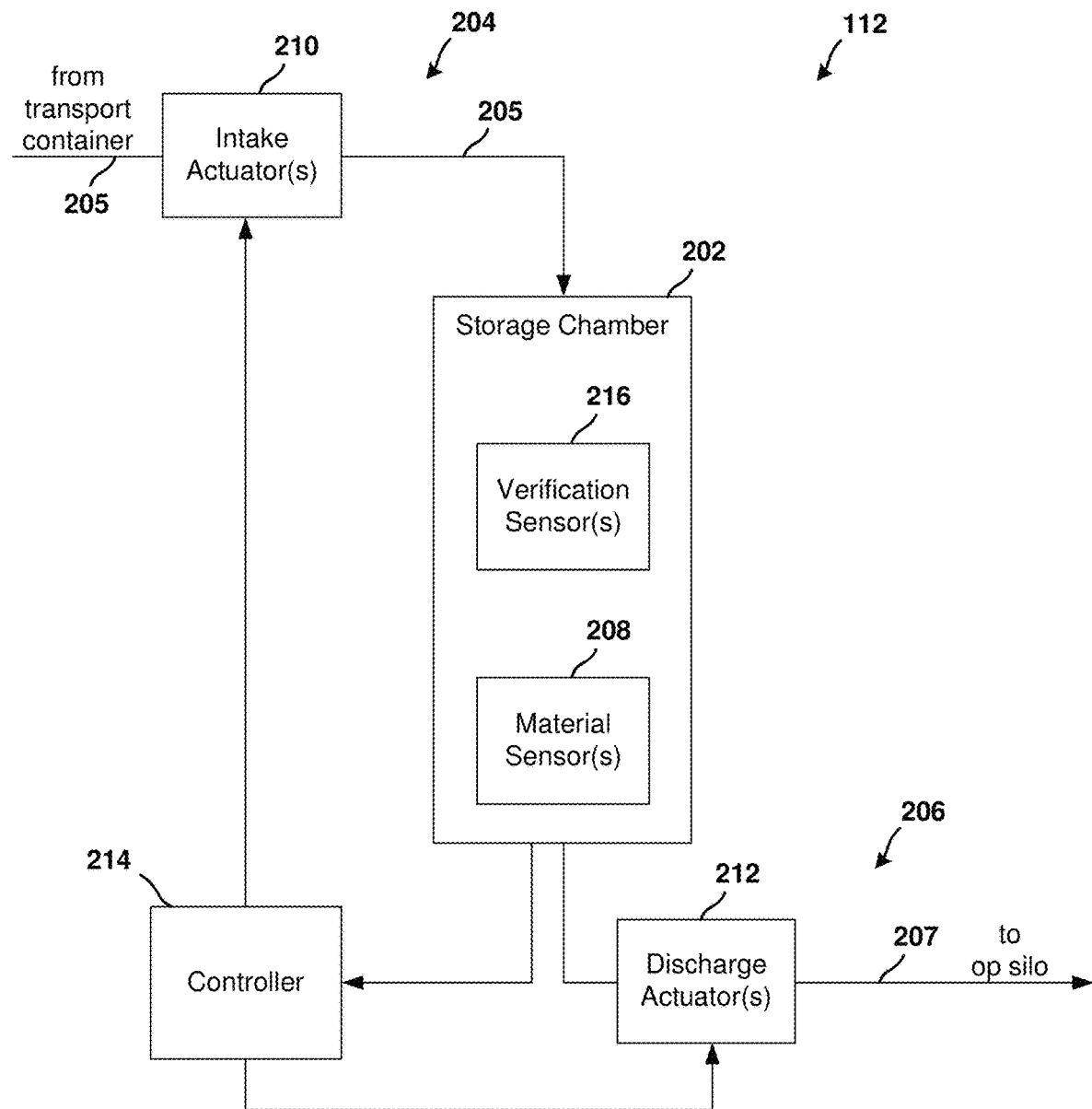
FIG. 2 is a schematic block diagram of a silo system according to certain aspects of this disclosure.

FIG. 2 is a schematic block diagram of a silo system 112 according to certain aspects of this disclosure. The silo system 112 includes a storage chamber 202, an intake pathway 204 associated with the storage chamber and configured to be pressurized by a first pneumatic source, and a discharge pathway 206 associated with the storage chamber that is also configured to be pressurized by a second pneumatic source. The first pneumatic source for the intake pathway 204 may be a blower configured to force air into a tubular structure. Likewise, second pneumatic source for the discharge pathway 206 may be blower configured to force air into a tubular structure. The silo system 200 further includes one or more material sensors 208 associated with the storage chamber 202, one or more intake actuators 210, one or more discharge actuators 212, and a controller 214 that is communicatively coupled to the one or more material sensors 208 and to the one or more actuators 210, 212.

The actuators 210, 212 enable a deposit of additional material from a transport container into the storage chamber 202 through a pressurized intake pathway 204 that is at least partially simultaneous with a discharge of material from the storage chamber through a pressurized discharge pathway 206 into an operational silo. The pressurized intake pathway and the interior of the storage chamber 202 are pneumatically isolated from the pressurized discharge pathway. The controller 214 is configured to control the one or more actuators 210, 212 in response to sensor data from the one or more material sensors 208 to thereby provide for deposit of material at least partially simultaneous with discharge of material. At least partially simultaneous in this context does not require that material deposit and material discharge always occur together. Rather, it means that the for a portion of time during which deposit is occurring, discharge is also occurring or vis versa.

Continuing with FIG. 2, the intake pathway 204 is configured to be coupled to a corresponding pathway of a transport container holding bulk material. In one configuration the intake pathway 204 includes a large diameter intake tube 205 and an intake actuator 210 in the form of a pinch tube that is in line with the intake tube. The intake tube may have a diameter of at least a 5 inches. The pinch tube 210 may be configured to pinch off the intake tube as a means of controlling, e.g., turning off and on, the deposit of the material into the storage chamber 202. To this end, the pinch creates a physical obstruction in the tube that blocks the movement of material through the tube.

The discharge pathway 206 is configured to be coupled to a corresponding pathway of an operational silo. In one configuration the discharge pathway 206 includes a large diameter discharge tube 207 and a discharge actuator 212 in the form of a vane feeder. An example vane feeder that may be used in the silo system 112 is described later with reference FIGS. 5A and 5B.

The vane feeder 212 is configured to control a gravity-fed discharge of the material from the storage chamber 202 into the discharge tube 207 while pneumatically isolating the storage chamber from the discharge tube. As such, the vane feeder enables pressurized deposit or loading of material into the storage chamber 202 simultaneous with the discharge or unloading of material from the storage chamber 202 to the operational silo. Accordingly, unlike conventional bulk material delivery models, simultaneous deposit into and discharge from an operational silo is enabled and thus, there is no need to wait for the completion of an ongoing discharge of bulk material from the storage chamber before beginning a deposit of bulk material from a pneumatic transport container into the storage chamber.

In one embodiment, the vane feeder is configured to support unloading material from the storage chamber at a rate of at least one ton per minute. Another discharge actuator 212 in the form of a blower (not shown) may be associated with the discharge tube 207. The blower is configured to apply pneumatic pressure in the discharge tube to transfer the material from the storage chamber 202 to the operational silo.

The material sensors 208 generate sensor data relating to a presence of material stored in the storage chamber 202. The sensor data is provided to the controller 214 where it is processed to control the deposit and discharge of material through the silo system 112. The material sensors 208 may include a plurality of load cells configured to generate weight information relating to a weight of material in the storage chamber 202. The material sensors 208 may include a fill level sensor configured to generate fill level information relating to a level of the material in the storage chamber 202. The material sensors 208 may include a pressure sensor for generating pressure information relating to air pressure in the storage chamber 202. Additional details on these types of material sensors 208 are provided later with reference to FIG. 6.

Continuing with FIG. 2, the silo system 200 may further include a one or more verification sensors 216 that provide sensor data to the controller 214 for purposes of verifying both the arrival of a transport container holding bulk material at a site, and the deposit of the bulk material from the transport container into the storage chamber 202. The one or more verification sensors 216 may include a proximity sensor that generates proximity information relating to a proximity of the transport container to the storage chamber 202. The proximity sensor may be an RFID sensor configured to sense an RFID tag associated with the transport container or the truck hauling the transport container. The proximity sensor may be a GPS tracking component or module of the controller 214 that monitors the location of a GPS component associated with the transport container or the truck hauling the transport container. The one or more verification sensors 216 may include a weight sensor that generates weight information corresponding to the weight of material in the storage chamber. The weight sensor may be one or more load cells which also function as material sensors. Additional details on these types of verification sensors 216 are provided later with reference to FIG. 6.

In one configuration, the silo system 112 further includes a baghouse (not shown) that includes one or more filters for filtering air discharged from the storage chamber 202. In one embodiment, the baghouse is configured to support an air flow rate of at least 2400 cubic feet per minute. An example baghouse that may be used in the silo system 112 is described later with reference FIG. 4.

Figure 3A:
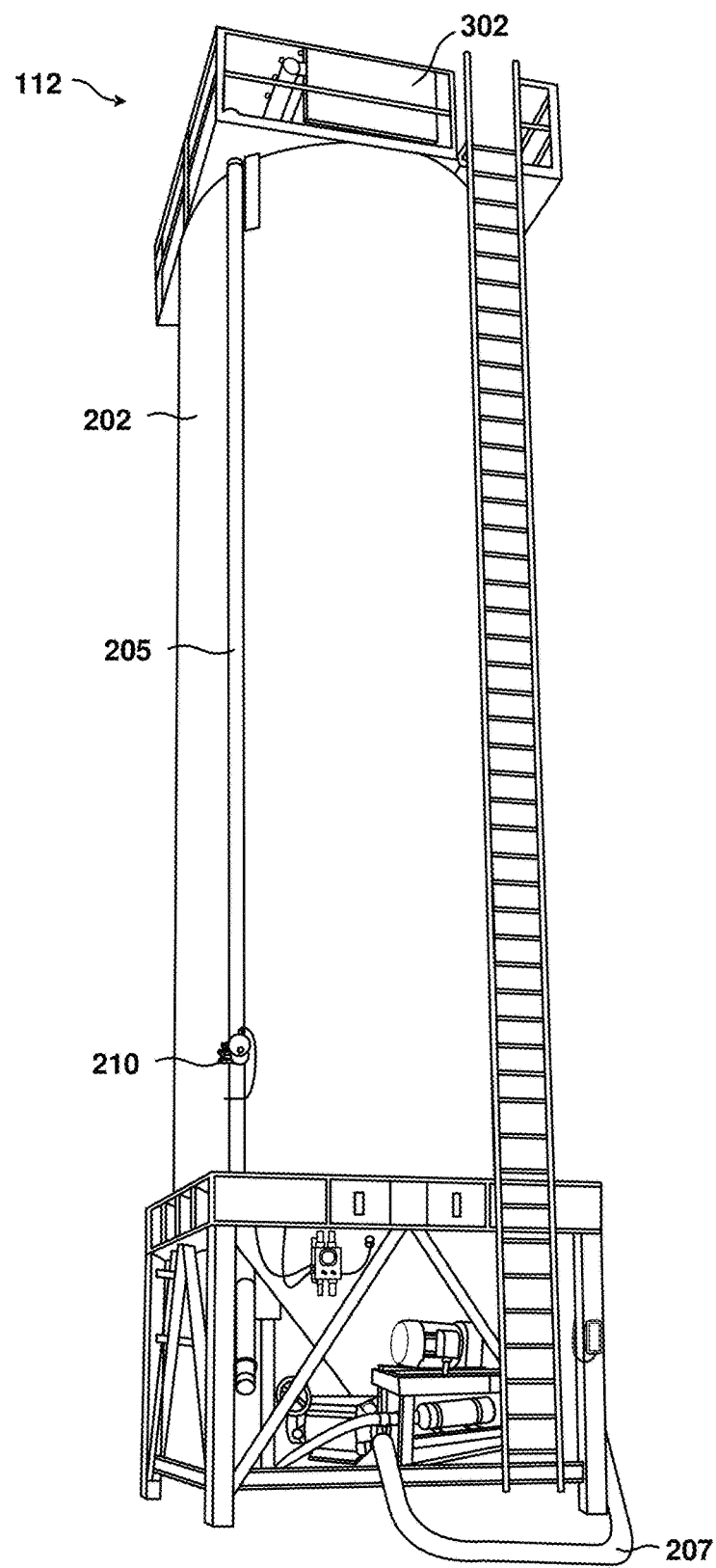
FIG. 3A is an illustration of one example of a silo system according to an aspect of the present disclosure.
Figure 3B:
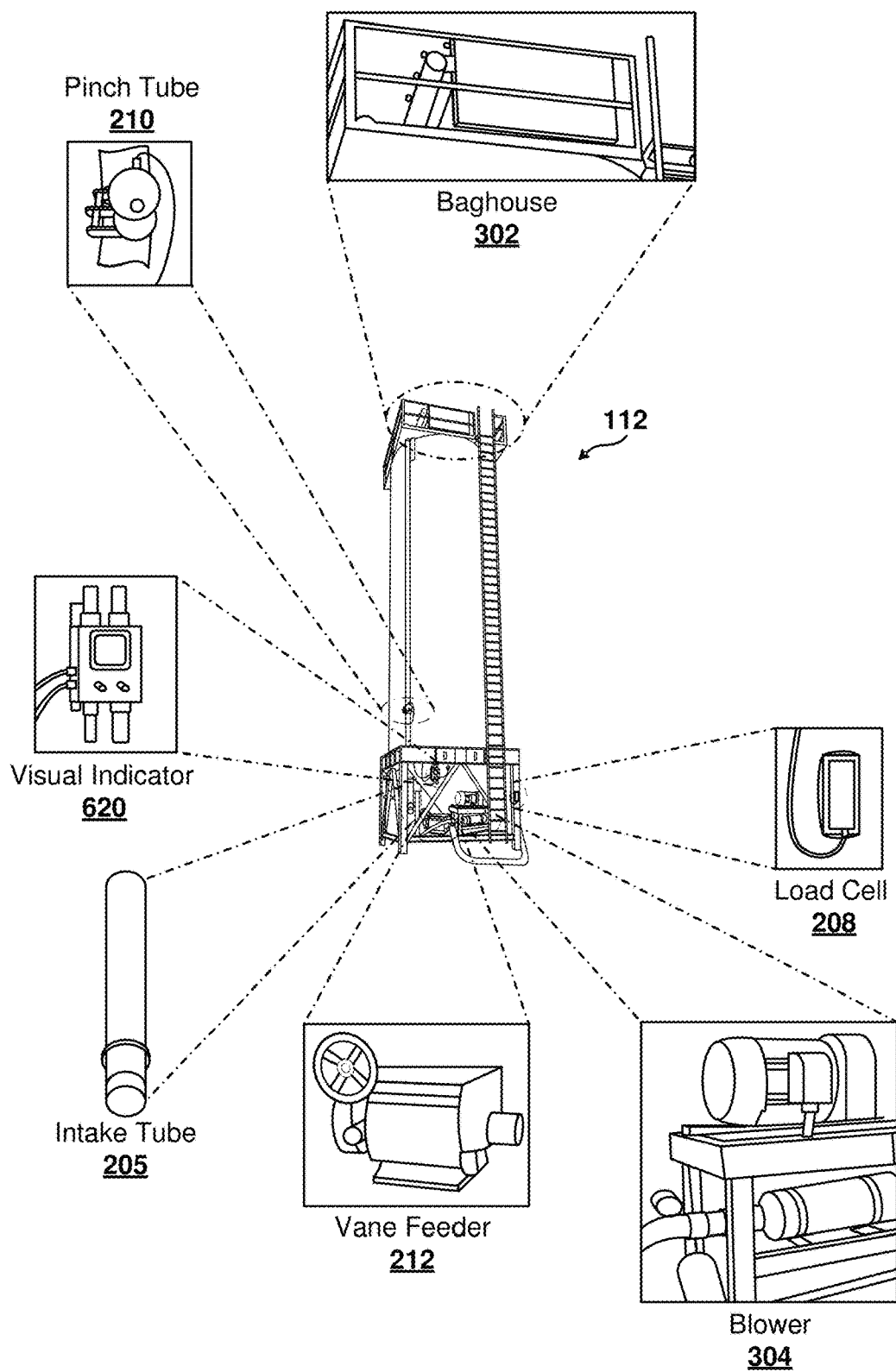
FIG. 3B is an exploded view showing details of certain components of the exemplary silo system of FIG. 3A according to some aspects of the present disclosure.

FIG. 3A is an illustration of one example of a fully-assembled silo system 112 according to an aspect of the present disclosure. FIG. 3B is an exploded view showing details of certain components of the exemplary silo system 112 of FIG. 3A according to some aspects of the present disclosure. The silo system 112 includes a bulk material storage unit in the form of a large-capacity silo, e.g., 120-160 tons.

Beginning at the deposit end of the silo system 112 and progressing toward the discharge end, the silo system includes a connector end of an intake tube 205 that forms part of the intake pathway 204 described above with reference to FIG. 2. The connector end of the intake tube 205 is configured to couple to a correspondingly sized output tube of a transport container carrying bulk material. The intake tube 205 is routed to the top of the storage chamber 202, where an output end is coupled to the interior of the storage chamber. The output tube of the transport container is a reinforced flexible rubber hose and is configured to withstand an internal pressure of up to 75 psi. The intake tube 205 is typically in the form of a schedule 40 steel pipe and is configured to withstand an internal pressure of up to 4600 psi.

In conventional bulk material delivery models, such as shown in FIG. 1A, transport of material from a transport container 108 to an operational silo 104 is conducted through hoses and pipes having a diameter of 4 inches. In an embodiment of the present silo system 112, however, the intake tube 205 is at least 5 inches in diameter. The larger diameter intake pathway of the present silo system 112 provides higher material handling capabilities, which in turn, enables a faster transfer of bulk material into the storage chamber 202.

The truck carrying the transport container may provide pneumatic pressure to transfer the material from the transport container, through the intake tube 205, to the top of and into the storage chamber 202. In operation, the truck blows bulk material into the intake pathway through the intake tube 205, which moves the material toward the top of the storage chamber 202, where the material enters the chamber. The material is moved through the intake tube 205 via pneumatic pressure.

As previously described with reference to FIG. 2, the intake pathway 204 includes a pinch tube 210. The pinch tube 210 is an electrical pinch tube that functions to cut off or block further ingress of bulk material from the transport container into the intake tube 205 under certain conditions. For example, the pinch tube may activate in cases of overpressure within the intake pathway 204, or if the storage chamber 202 has reached its capacity and cannot intake additional material. Utilizing an electric pinch tube 210 rather than a pneumatic pinch tube eliminates the need for the consignee to provide a source of pneumatic pressure. In this way, the silo system 112 may remain operational at all hours, even when the consignee site is closed, unsupervised, and/or unoccupied. This can open up the schedule for delivery of material to the portable silo, further improving flexibility for the hauler.

Figure 4:
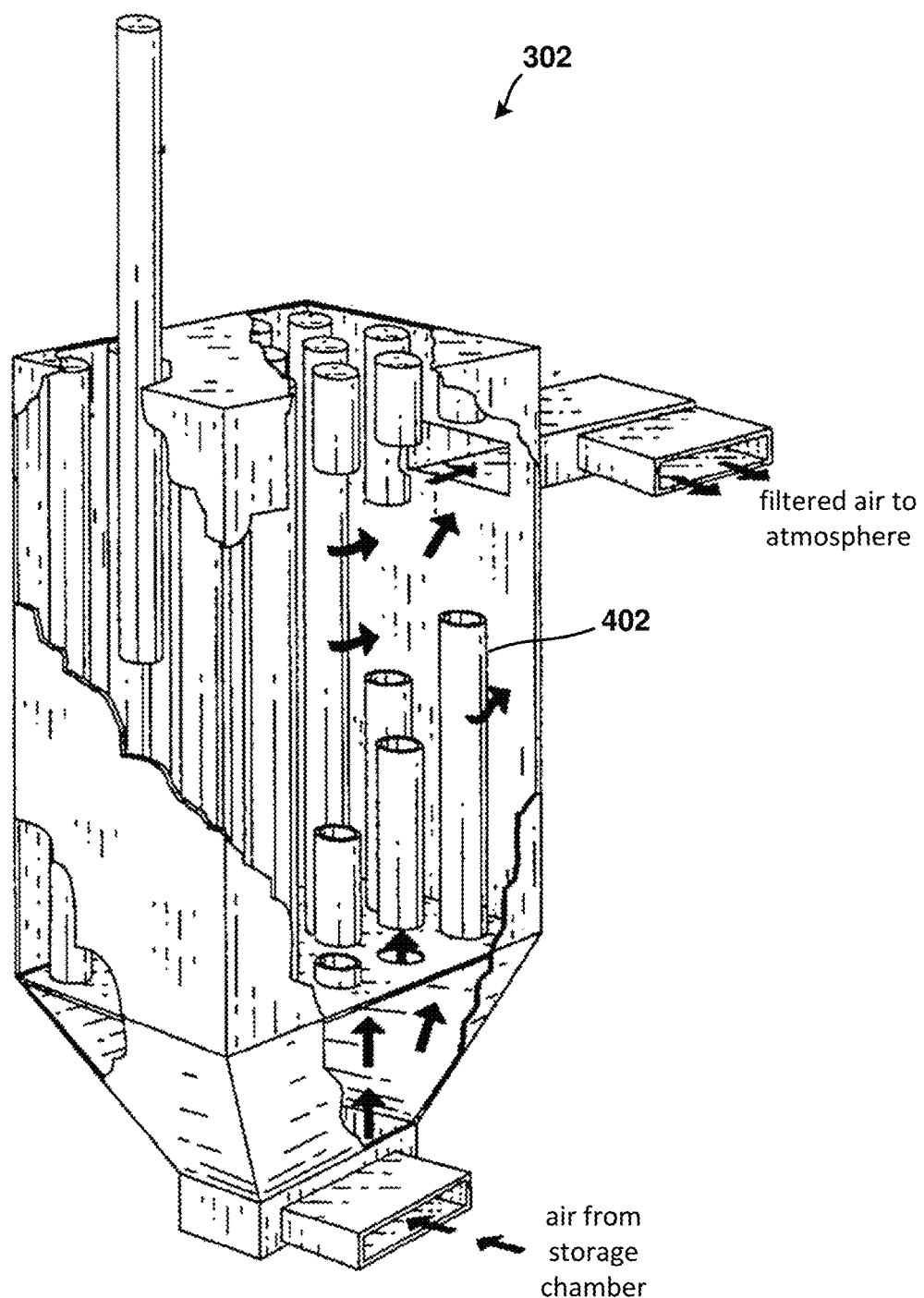
FIG. 4 is a schematic illustration of one example of a baghouse that may be included in the silo system of FIG. 3A.

Continuing with FIGS. 3A and 3B, the silo system 112 may include an air filter mechanism. In one configuration, the air filter mechanism may be in the form of a baghouse 302 positioned at the top of the storage chamber 202. FIG. 4 is an illustration of one example of a baghouse 302 that may be included in the silo system 112 of FIG. 3A.

In operation, as bulk material enters the storage chamber 202, the material displaces air inside the chamber. In addition, the airflow that moves the material through the intake pathway 204 enters the storage chamber 202. Thus, without release, overpressure could rupture the storage chamber 202 or create enough backpressure to prevent further delivery of material into the chamber. Thus, the storage chamber 202 must be vented to allow excess air to exit into the atmosphere without allowing product dust to escape with it. Air quality regulations therefore require the released air to be filtered to remove a sufficient amount of dust.

Accordingly, the silo system 112 includes a baghouse 302 to filter the dust or particulate matter from the air as it is released from the storage chamber 202. With reference to FIG. 4, the baghouse 302 includes one or more cylindrical structures 402, e.g., bags or tubes, made of a fabric filter medium. Conventional silos may include six cylinders. However, in an aspect of the present disclosure, the baghouse 302 included in the silo system 112 may be substantially larger than a baghouse in a conventional silo. A larger baghouse 302 enables increased airflow, or an increased filter rate. In this way, the venting capacity of the storage chamber 202 matches the increased input from the large-diameter, high-volume intake tube 205; thus increasing the rate that material can be deposited into the storage chamber 202 relative to the rate typical in a conventional operational silo.

In one example, the baghouse 302 in the silo system 112 disclosed herein may double the size of the conventional silo's baghouse, e.g., including twelve or more cylinder structures 402. In a further example, such a baghouse may include twelve individual filter cartridges, which provide 472 square feet of filter area and 2400 cubic feet per minute (CFM) airflow. This compares to a typical baghouse for similar applications that includes six filter cartridges, with half the square footage and CFM airflow.

Figure 5A:
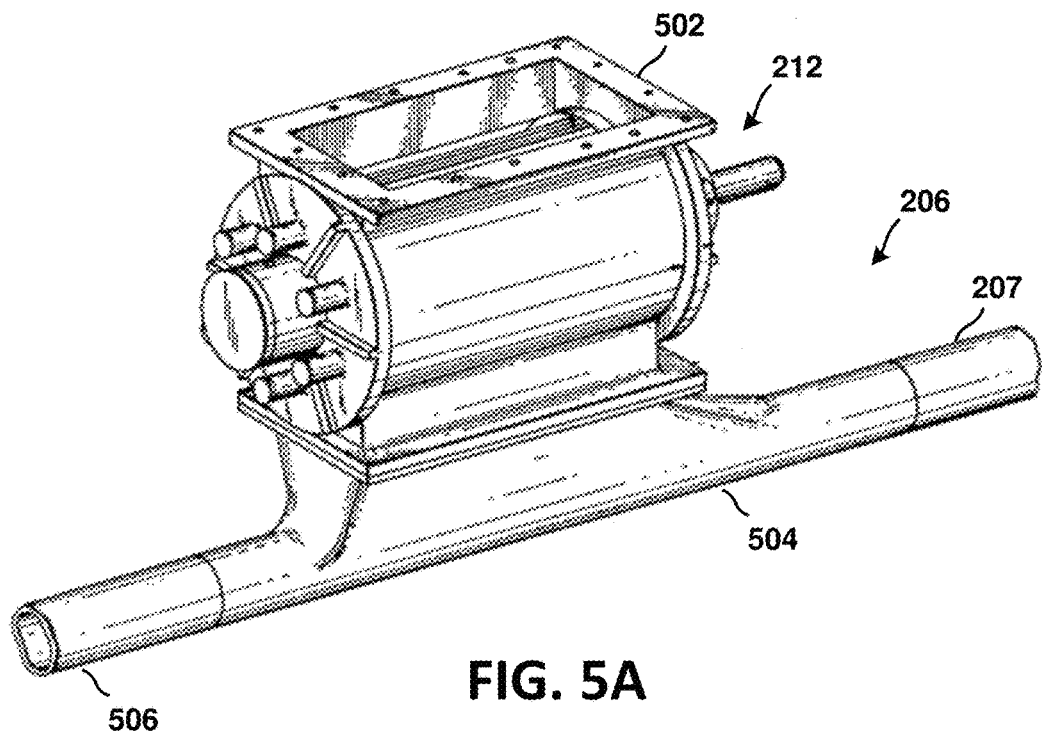
FIGS. 5A and 5B are schematic illustrations of one example of a vane feeder that may be included in the silo system of FIG. 3A.
Figure 5B:
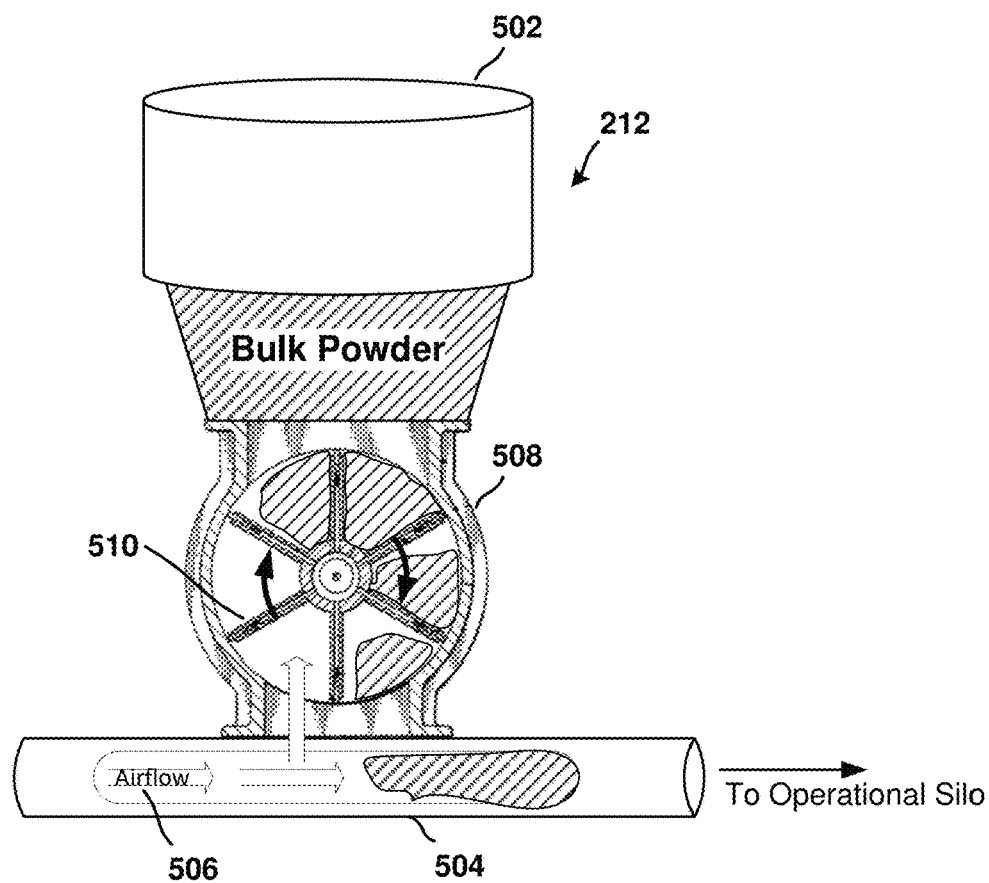

Returning to FIGS. 3A and 3B, material is discharged from the storage chamber 202 using an unpressurized gravity unloading, which is generally safer than pressurized unloading. To this end, the discharge end of the silo system 112 includes a vane feeder 212, also referred to as a rotary feeder, rotary airlock feeder. FIGS. 5A and 5B are illustrations of one example of a vane feeder 212 that may be included in a silo system 112. The vane feeder 212 includes a material inlet 502 that interfaces with an outlet of the storage chamber 202 to receive bulk material, and an output pipe 504 that interfaces with the discharge pathway 206 at one end and a source of airflow 506 at the opposite end. The source of airflow 506 may be a blower 304, as shown in FIG. 3B, configured to pressurize the output pipe 504 and the discharge pathway 206 tube/hose from the vane feeder 212 to transfer material to the operational silo. In one embodiment, the output pipe 504 and the discharge tube 207 defining the discharge pathway 206 are high volume capacity to allow for faster discharge of material from the storage chamber 202. For example, the output pipe 504 and the discharge tube 207 may have a diameter of at least 5 inches.

The output pipe is typically in the form of a schedule 40 steel pipe and is configured to withstand an internal pressure of up to 4600 psi. The discharge tube 207 is a reinforced flexible rubber hose and is configured to withstand an internal pressure of up to 75 psi.

In operation, bulk material in the storage chamber 202 is gravity fed or force fed through the material inlet 502 and into the housing 508 of the vane feeder 212. A multi-vane rotor 510 within the housing 508 is driven about a rotor shaft by a motor. An airflow 506 stream flows through the output pipe 504 in the direction toward the operational silo, while the rotor 510 is driven in the direction indicated by the arrows. As bulk material is fed into the housing 508, the rotor 510 vanes move the material into the airstream passing through the output pipe 504. The rotor 510 vanes isolate the storage chamber 202 above from the discharge point below, allowing for pressurized filling of the storage chamber while simultaneously discharging material from the storage chamber. Thus, the vane feeder 212 functions to isolate the potentially pressurized storage chamber 202 that is being loaded with bulk material, from the discharge tube 207 that is moving material from the storage chamber 202 to the operational silo. In one configuration, the vane feeder 212 may be oversized for rapid discharging of the material from the storage chamber 202. For example, a vane feeder 212 may be sized to support unloading material from the storage chamber into the operational silo at a rate of one ton per minute.

Figure 6:
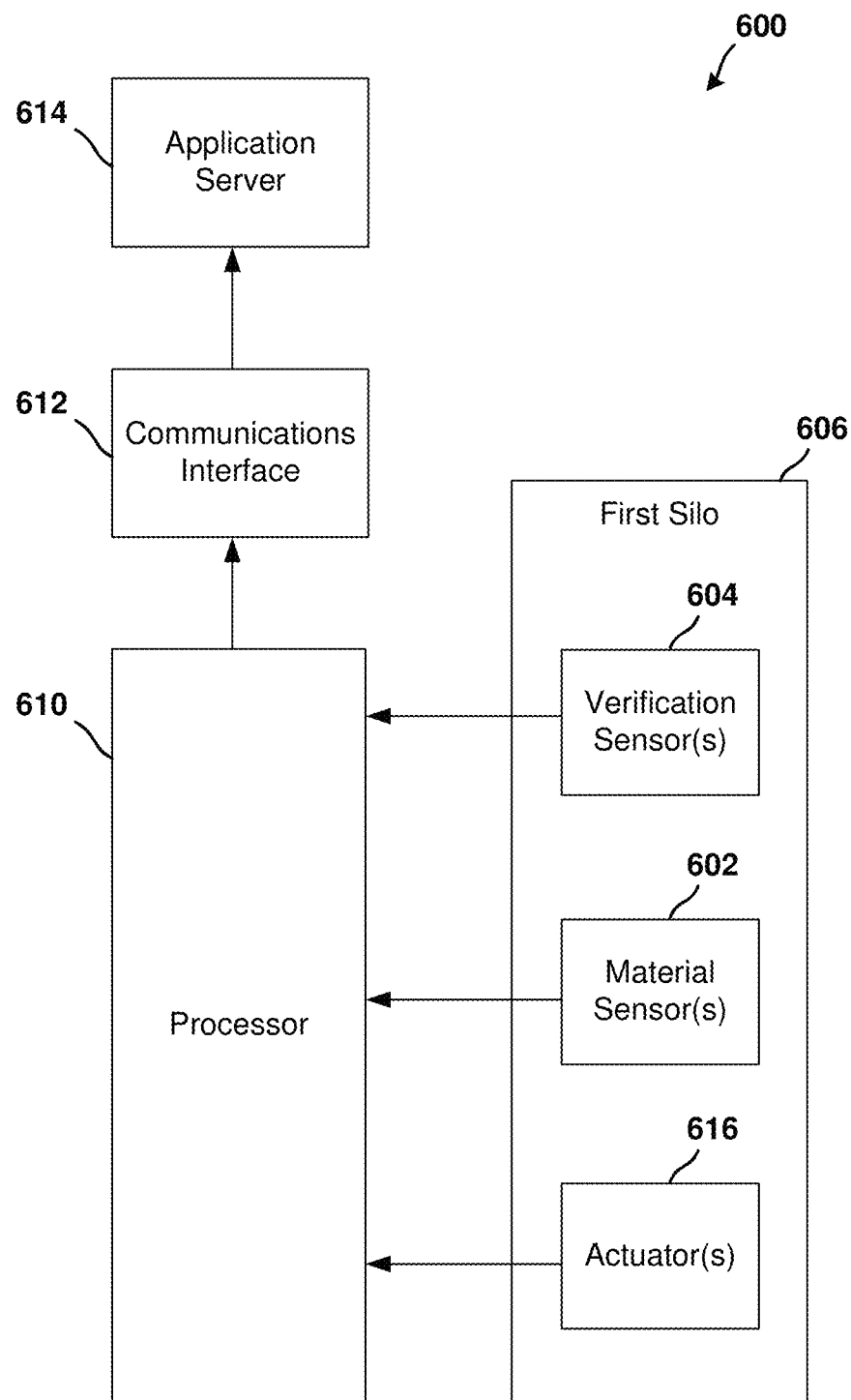
FIG. 6 is a schematic block diagram of a bulk material management system 600 according to certain aspects of this disclosure.

FIG. 6 is a schematic block diagram of a bulk material management system 600 according to certain aspects of this disclosure. The bulk material management system 600 includes one or more material sensors 602 configured to be associated with a first silo 606 that holds bulk material, and one or more verification sensors 604 configured to be associated with one or more of the first silo and a transport container (or truck carrying a transport container). The material sensors 602 are configured to generate real-time material data relating to a presence of material in the first silo 606, while the verification sensors 604 are configured to generate real-time verification data relating to a deposit of additional material from a transport container into the first silo. The system 600 further includes a processor 610 and a communication interface 612. The processor 610 is configured to receive the real-time verification data and to process the real-time verification data to confirm the deposit of additional material from the transport container into the first silo 606. The communication interface 612 is communicatively coupled to the processor 610 and configured to communicate the real-time verification data to an application server 614.

The one or more verification sensors 604 may include a PTO engagement sensor for generating real-time PTO information indicative of an operational condition of the intake pathway. The PTO engagement sensor may be associated with the truck hauling a transport container of bulk material. An operational condition may be indicated by the output of a PTO engagement sensor that is configured to determine the on-state and off-state of a blower generating a pneumatic effect within an intake pathway of the first silo 606. For example, a power source of the truck hauling the transport container may be used to power a blower and start the pneumatic process to convey material from the transport container through the intake pathway and into the first silo 606. The PTO engagement sensor is configured to detect such power engagement and subsequent disengagement and output corresponding PTO information to the processor 610. The processor 610 may determine that the material is being deposited in response to PTO information corresponding to an engagement/on signal from the PTO engagement sensor. Subsequently, when the on state is no longer indicated by the output of the PTO engagement sensor, the processor 610 may determine that the deposit of material is completed. Based on the duration of material delivery, i.e., the time between the engagement/on signal and the disengagement/off signal, the processor 610 may determine or confirm the amount of material that was deposited. Accordingly, the PTO information output by the PTO engagement sensor provides an additional data point to corroborate actual, physical delivery of bulk material to the first silo 606.

The one or more verification sensors 604 may include a weight sensor, e.g. a load cell, for generating real-time weight data relating to an increase in weight of the first silo 606 corresponding to the deposit of additional material from the transport container into the first silo. In this case, a deposit of bulk material from the transport container to the first silo 606 may be confirmed by the comparing a known weight of the bulk material in the transport container to the increase in weight of the first silo. If the increase in weight equals the known weight then the processor 610 may determine that the material was deposited.

The one or more verification sensors 604 may include a proximity sensor for generating real-time proximity information relating to a proximity of the transport container to the first silo 606. In this case, the processor 610 is configured to confirm the arrival of the transport container at the geographic location of the first silo based on the proximity information. The proximity sensor may be an RFID sensor configured to sense an RFID tag associated with the transport container or the truck hauling the transport container. The proximity sensor may be a GPS tracking component or module of the processor 610 that monitors the location of a GPS component associated with the transport container or the truck hauling the transport container.

The system 600 may further include a plurality of actuators 616 configured to be associated with the first silo 606. The actuators 616 include one or more intake actuators that are configured to enable a deposit of additional material from the transport container into the first silo 606 through an intake pathway, and one or more discharge actuators that are configured to enable a discharge of material from the first silo through a discharge pathway into a second silo. The processor 610 is further configured to control the one or more intake actuators and the one or more discharge actuators in response to sensor data from the one or more material sensors. In one embodiment, the processor 610 is configured to enable through the plurality of actuators 616, a deposit of material into the first silo 606 that is at least partially simultaneous with a discharge of material from the first silo. At least partially simultaneous in this context does not require that material deposit and material discharge always occur together. Rather, it means that the for a portion of time during which deposit is occurring, discharge is also occurring or vis versa.

Figure 7:
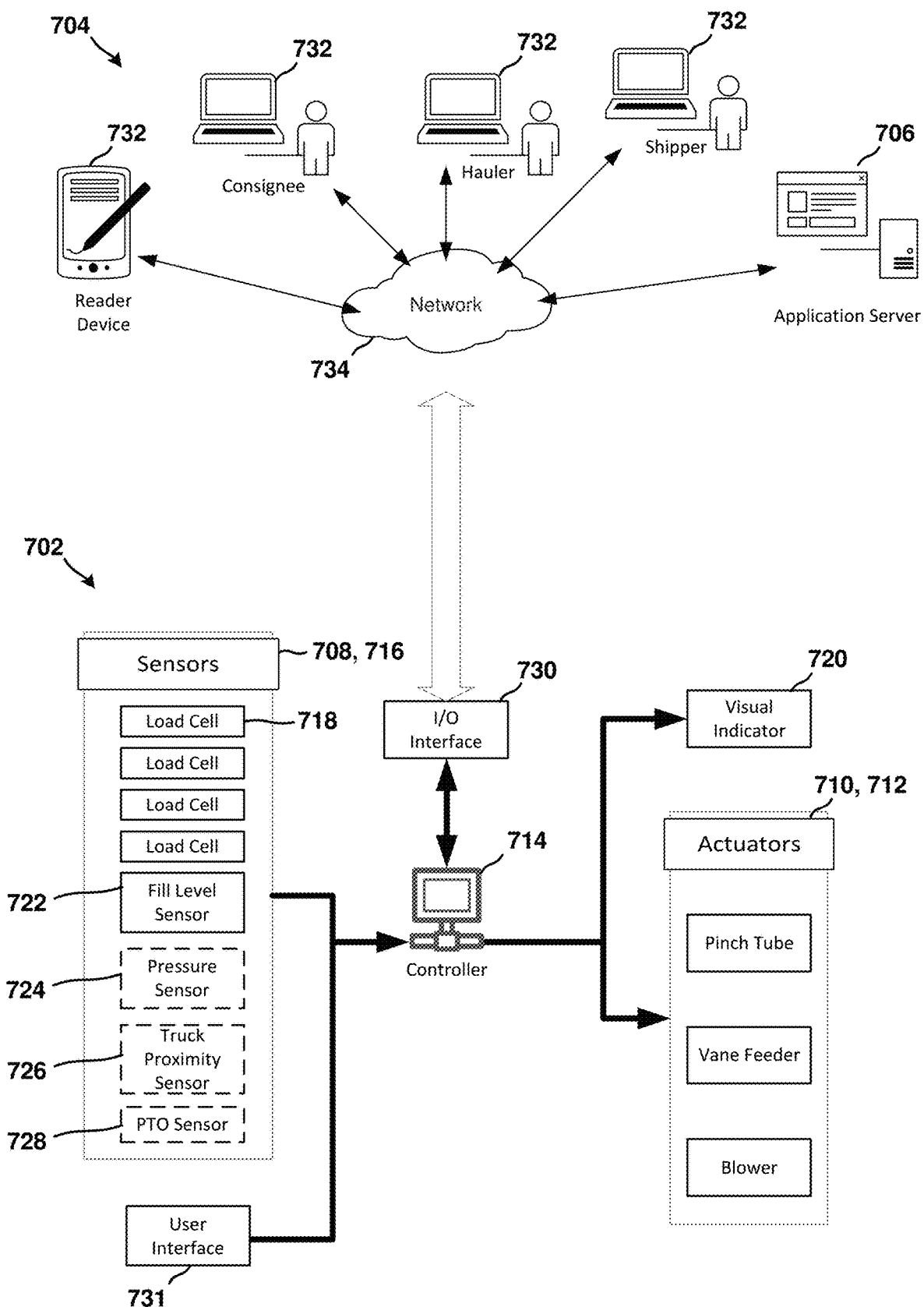
FIG. 7 is a schematic block diagram illustrating functional details of a silo system in conjunction with a bulk management system according to certain aspects of this disclosure.

FIG. 7 is a schematic block diagram illustrating functional details of a silo system 702 integrated with a bulk material management system 704 according to certain aspects of this disclosure. Similar to the silo system 112 described above with reference to FIG. 2, the silo system 702 of FIG. 7 includes one or more material sensors 708, one or more verification sensors 716, one or more intake actuators 710, one or more discharge actuators 712, and a controller 714.

In one embodiment, the one or more material sensors may be load cells 718. A load cells 718 may be a strain gauge, a piezoelectric load cell, a hydraulic load cells, etc. that provides a signal corresponding to the weight of the storage chamber of the silo system. The load cells 718 may be mounted to the legs of the silo, such as shown in FIG. 3B. In one example, the storage chamber may include three, four, or more legs, each being outfitted with a load cell to provide multiple load cells in parallel. In this way, the output of the plural load cells can be added or combined to generate a single weight for the contents of the portable silo (e.g., tonnage), to thereby provide real-time, accurate measurements of the weight of the material in the storage chamber. The load cells 718 may be connected to visual indicator 720 on the exterior of the silo system 702, such as shown in FIG. 3B, to show a more detailed level of material in the silo (e.g. "35% remaining" or "35 tons remaining" as opposed to current system of "red", "yellow" and "green").

In another embodiment, the one or more material sensors may be a level sensor 722 (e.g., "Bindicator") that is configured to sense the level of bulk material within the storage chamber of the silo system 702. In yet another embodiment, the one or more material sensors may include a pressure sensor 724 located within storage chamber of the silo system for sensing the air pressure inside the chamber.

In one embodiment, the one or more verification sensors 716 may include a proximity sensor 726 configured to detect if a delivery truck carrying a transport container of bulk material is within a given distance or radius of the silo system 702. The proximity sensor 726 may be anyone of: an RF sensor configured to detect an RFID tag mounted to the truck, a radio (e.g., Bluetooth, WiFi, etc.) receiver configured to a detect a radio signal transmitted by a transmitter associated with the truck when the truck is within a defined range of the receiver, or a GPS monitoring system connected to a GPS network that tracks the location of the truck based on a GPS system integrated into the truck.

In another embodiment, the one or more verification sensors 716 may include a PTO engagement sensor 728. As described above, the PTO engagement sensor may be associated with the truck hauling a transport container of bulk material and is configured to detect when the truck's power is being used to engage a blower to start the pneumatic process to convey material from the transport container into the storage chamber. The PTO engagement sensor detects such power engagement and subsequent disengagement and outputs corresponding PTO information to the controller 714.

The visual indicator 720 may provide indications related to the fill level of the storage chamber. The visual indication may be color based, e.g., green/yellow/red lights wherein a red light indicates the storage chamber is full, a yellow light indicates the storage chamber is approaching capacity, and a green light indicates the storage chamber has plenty of capacity. For those silo systems 702 equipped with a pressure sensor 724, the visual indicator 720 may include a blue light that indicates an overpressure condition within the storage chamber. Some examples may provide more granular information, e.g., corresponding to the force sensors or any other suitable sensor for dynamically informing about the fill level of the portable silo. The visual indicator 720 may be communicatively coupled to, or responsive to, sensor data from any suitable sensor including but not limited to one or more load cells 718, a fill level sensor 722, a pressure sensor 724, a proximity sensor 726, or a PTO engagement sensor 728.

The controller 714 includes a processor and a communications interface configured to receive data from the material sensors 708 and the verification sensors 716 and to output control signals to one or more of the intake actuators 710 and the discharge actuators 712. The controller 714 receives signals from one or more of the load cells 718, the fill level sensor 722, the pressure sensor 724, the proximity sensor 726, and the PTO engagement sensor 728, and processes the signals to control the operation of the silo system 702 using one or more of the intake actuators 710 and the discharge actuators 712. For example the controller 714 may control operation of the silo system 702, including the electric pinch tube to enable or disable the deposit of material, and the vane feeder and blower to enable or disable the discharge of material. The controller 714 may also be coupled to the visual indicator 720 to control the lights or indicators to indicate the fill status of the silo system 702.

Information collected by the controller 714 of the silo system 702 may be communicated to the bulk material management system 704 via the network 734 using one of several communication modalities, including but not limited to wireless communication with the Internet. For example, the I/O interface 730 may be a machine-type communication (MTC) or machine-to-machine (M2M) device configured for wireless communication over a cellular network 734, including but not limited to a 4G LTE network. In other examples, the I/O interface 730 may be a Wi-Fi device, a Bluetooth device, or any other suitable wireless or wired communication interface. The silo system 702 may provide direct user input/output to the controller 714 through a user interface 731 (e.g., a monitor, GUI and/or keyboard at the site of the silo system).

Information from the silo system 702 may be conveyed to an application server 706, which may be hosted by a device/system 732 at the hauler, at a third-party site, on the 'cloud,' or at any suitable location. The application server 706 may be configured to aggregate data from one or more silo systems 702. In some examples taking advantage of blockchain technology, an application/database can aggregate consignee production requirements, hauler load commitments, shipper material commitment and consignee's current inventory levels in a shared ledger to allow for a blockchain transaction by all parties, securely and automatically confirming and completing transactions through the full supply circuit of "order/load/deliver/unload/update inventory/invoice/pay/re-order".

The information at the application server 706 may be made available to other devices/systems 732 configured to access the application server. Users such as the consignee, the hauler, the shipper or any other entity with authorization to access the application server 706 may accordingly access stored sensor data from any number of silo systems 702, including load cell weights, fill levels, pressure, etc., either real-time, at a selected time, or as a function of time (e.g., in a chart or graphical form).

The silo system 702 may generate a database based on information received by the controller 714, or contribute information to the bulk material management system 704. For example, the silo system 702 may provide information to the application server 706 that generates a database corresponding to one or more silo systems 702. In addition, the application server 706 may utilize the sensor data, potentially combined with other information, such as product orders, product shipment indications, etc., to provide users additional information. For example, users may obtain delivery times, usage history, delivery schedules. Haulers may take advantage of the databases combined over a plurality of silo systems 702 to generate still further information, including but not limited to truck efficiency (e.g., tons delivered per day), silo efficiency, and truck delivery routes.

Where the parties, e.g., hauler, shipper and consignee, have previously agreed and defined the scope and method of data transfer, the silo system's communication capabilities may serve as a connection between the shipper (e.g. cement manufacturer) and consignee (e.g. ready mix producer) to automatically confirm receipt of materials and match transaction records to generate sales invoices. The consignee (e.g. ready mix producer) may utilize the silo system's communication capabilities to automatically, and in real-time, send material usage data, along with other plant operations information such as production rates and scheduling, preventive or predictive maintenance triggers and workforce time/payroll information to its centralized office or database.

Relevant parties can access information including but not limited to the current level in a storage chamber of a silo system 702; what the consignee has received; and what the consignee has discharged out of the storage chamber of the silo system. The hauler can access aggregated data from multiple silo systems 702 which enables the hauler to plan deliveries to multiple parties more efficiently. Knowledge of capacity, historic usage rates, current levels of inventory, etc. can enable the hauler to prioritize deliveries to those most in need, and to determine when it may be appropriate to defer deliveries to consignees who have remaining inventory.

The application/database available through the application server 706 can enable raw material usage confirmation/reporting by confirming on-hand inventory, plus authenticating incoming inventory less production usage by the consignee. This feature may be a component of the overall inventory 'cycle' that would be a part of automated re-order, blockchain or other automated management system, and/or a component of a fully automated process.

In one embodiment, actual delivery of incoming inventory of bulk material may be authenticated by the silo system 702 without the need for consignee presence at delivery site or consignee manual input to the system, using the verification sensors 726, 728. For example, an increase in weight at storage chamber by one truckload (as sensed by one or more load cells 718), contemporaneous with: 1) a proximity detection (as sensed by a proximity sensor 726) indicating that the identified delivery truck carrying a transport container of bulk material was proximate to the storage chamber and 2) an power engagement/on detection (as sensed by a PTO engagement sensor 728) followed by a power disengagement/off detection can substantiate delivery of a load of bulk material to the desired location. Other various combinations of sensor 726, 728 inputs may be used to confirm actual delivery. For example, in the absence of signals from load cells, the weight or amount of material deposited may be inferred from the duration of time between a power engagement/on detection (as sensed by a PTO engagement sensor 728) and a power disengagement/off detection.

The application/database available through the application server 706 may graphically illustrate inventory levels and usage/consumption to allow the consignee to accurately plan inventory requirements. For example, a graphical dashboard may show the consignee's material requirements/bill of materials daily/weekly/monthly, and may overlay current/planned deliveries to show expected material shortage or excess. In some examples, such an application may automate future orders to address gaps between inventory and demand, adjusting real-time for changes in demand forecasts, allowing semi-automatic adjusting per pre-set maximum and minimum re-order/cutoff points, or allowing fully manual ordering to address expected inventory imbalance or incorporate other haulers/shippers not connected to the application/database.

Figure 8:
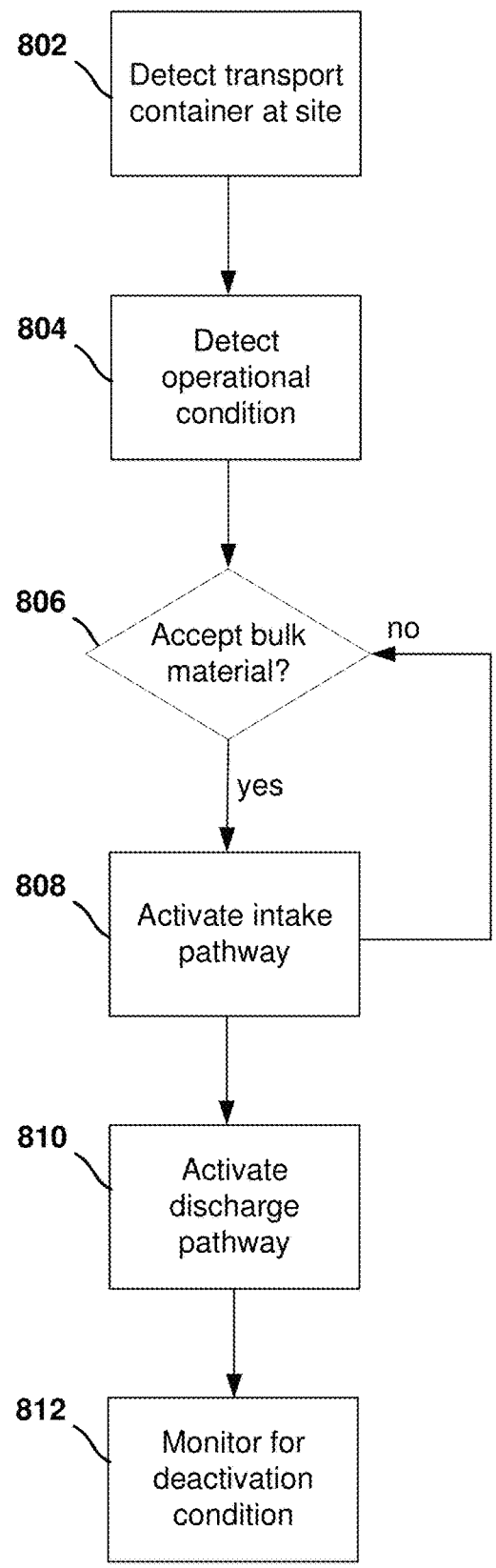
FIG. 8 is a flow chart of a method of delivering a bulk material carried by a transport container to a site.

FIG. 8 is a flow chart of a method of delivering a bulk material carried by a transport container to a site. The method may be performed, for example, by a silo system of FIG. 2 that is located at the site.

At step 802, a controller (or processor) of the silo system detects an arrival of a truck carrying a transport container of bulk material at the site. The arrival may be detected based on signals from a proximity sensor, e.g., RFID sensor, GPS tracking, that is associated with the silo system.

At step 804, the controller of the silo system detects an operational condition of an intake pathway between the transport container and the storage chamber of the silo system. The operational condition may be detected based on signals received from one or more verification sensors. For example, a PTO engagement sensor associated with the truck hauling the transport container may output an engagement/on signal when a power source of the truck is used to power a blower coupled to the intake pathway. The blower may be associated with the truck or the transport container. The on state of the blower may result from a manual operation by an operator at the transport container. An engagement/on output signal from the PTO engagement sensor may further serves as a real-time verification that the bulk material is actually being delivered.

At step 806, the controller determines whether the storage chamber is able to accept bulk material. For example, the controller may receive signals from one or more material sensors, e.g., load cells, level sensors, pressure sensor, associated with the silo system that are indicative of the amount of material in the storage chamber. If the storage chamber is not able to accept bulk material, the process loops back to step 806 where the processor continues to determine whether the storage chamber is able to accept bulk material.

If the storage chamber is able to accept bulk material, the process proceeds to step 808, where the controller activates an intake pathway of the silo system that is engaged with an output port of the transport container. The intake pathway may include an intake tube and an intake actuator, e.g. pinch tube, that is configured to block flow through the tube. The intake pathway may be activated, for example, by setting a normally closed pinch tube that blocks flow through the tube, to an open state that allows material to flow through the tube.

At step 810, the controller activates a discharge pathway of the silo for a period of time that at least partially coincides with the activation of the intake pathway. The discharge pathway is configured to transport material from the storage chamber to another location on site. In one configuration, the discharge pathway includes a discharge tube, a first discharge actuator in the form of a vane feeder, and a second discharge actuator in the form of a blower. The vane feeder functions to isolate the pneumatic pressure within the discharge pathway from the pneumatic pressure within the intake pathway and the interior of the storage chamber, to thereby provide for simultaneous deposit and discharge of material into and out of the storage chamber in a manner that reduces or avoids disruptive pneumatic effects at the point of discharge, such as uneven or uncontrollable flow of material.

At step 812, the controller monitors for a condition to deactivate the intake pathway. The condition may relate to the amount of material in the storage chamber. For example, if the controller determines that the storage chamber is near capacity based on signals received from one or more material sensors, the controller will deactivate the intake pathway by setting the intake actuator, e.g., pinch tube, to a state where it blocks flow through the intake tube. Alternatively, the controller may send a signal to the truck to turn off the power source that is powering the blower coupled to the intake pathway. Although the order of activation shown in FIG. 8, includes activating the intake pathway prior to the discharge pathway, the order of activation is not limited as such, and may be the opposite. Furthermore, activation of the two pathways may occur at the same time.

Thus disclosed herein in a silo system and related method that provides for a transfer of bulk material from a hauler's transport container to a storage chamber simultaneous with a transfer of bulk material from the chamber to a consignee's operational silo. Positioning the vane feeder at the discharge point isolates the storage chamber from the discharge point, thereby enabling pressurized filling of the storage chamber at the same time as material is discharged from the storage chamber into the consignee's affixed operational silo. This reduces or eliminates the wait time for a delivery truck to begin unloading or depositing bulk material at consignee site. The electric pinch tube reduces or eliminates need to coordinate with the consignee, and can open up the window for delivery to potentially any time, day or night.

The silo system disclosed herein is configured to significantly increases the speed of loading and unloading material to and from the storage chamber of the silo. This is enabled by oversized fill and discharge pipes/hoses, a more powerful blower, and larger baghouse venting. For example, based on a gross vehicle weight (GVW) limit of 80,000 lbs, a typical truckload may carry 27 tons of material. In conventional systems, for a truck to unload its entire load directly into an operational silo, it may take an hour, two hours, or more. According to an aspect of the present disclosure, by utilizing the disclosed features in a suitable combination (e.g., wider intake hoses, stronger blower, larger baghouse, larger vane feeder), a full truckload may be unloaded into the portable silo in 30 minutes or less.

As previously described, the silo system disclosed herein may be portable, i.e., configured to be transported and semi-permanently placed at a first site and later removed and transported to another site. A portable silo system has several advantages over permanent silo systems including the ability to be moved different locations as market and operational needs change, and a smaller size that requires a smaller footprint of land that in turn reduces the expense of land for the consignee.

In permanent silo systems "operational" silos include fixed legs that are elevated above the plant to allow for gravity discharge and feed. The engineering for erection, and resulting cost and time of removal and transport of these silos makes them very "permanent" (and require shutdown of the plant for removal). Furthermore, removal of such silos typically involves the destruction or deformation of component parts. For example, the removal of a permanently installed operational silo may require the cutting of fixed legs that support the silo chamber. The portable silo disclosed herein, in comparison, is hauled to the site on its own integral axle/wheels, erected and/or removed in a day, and can be installed or removed while the plant is in operation.

The portable silo system also has several advantages over other, less permanent storage containers, such as a guppy or pig. For example, a portable silo system configured according to aspects of this disclosure might have about ⅓ the footprint of a conventional guppy or pig of similar capacity. The portable silo system transfers product to consignee's operational silo as needed, for example, by simple operator push-button that actuates the vane feeder and blower at the discharge pathway. Thus, the consignee avoids need to manually pressurize a tank and adjust multiple valves as required when using a guppy or pig and avoids related safety hazard exposure.

A portable silo system provides additional storage capacity on-site at the consignee location. This reduces or eliminate the consignee's risk of running out of raw materials and eliminate the consignee's need for additional equipment. The consignee and shipper gain additional local storage capacity within their market areas without the need for significant added capital and operating costs associated with a fixed, centralized terminal or distribution facility.

Figure 9:
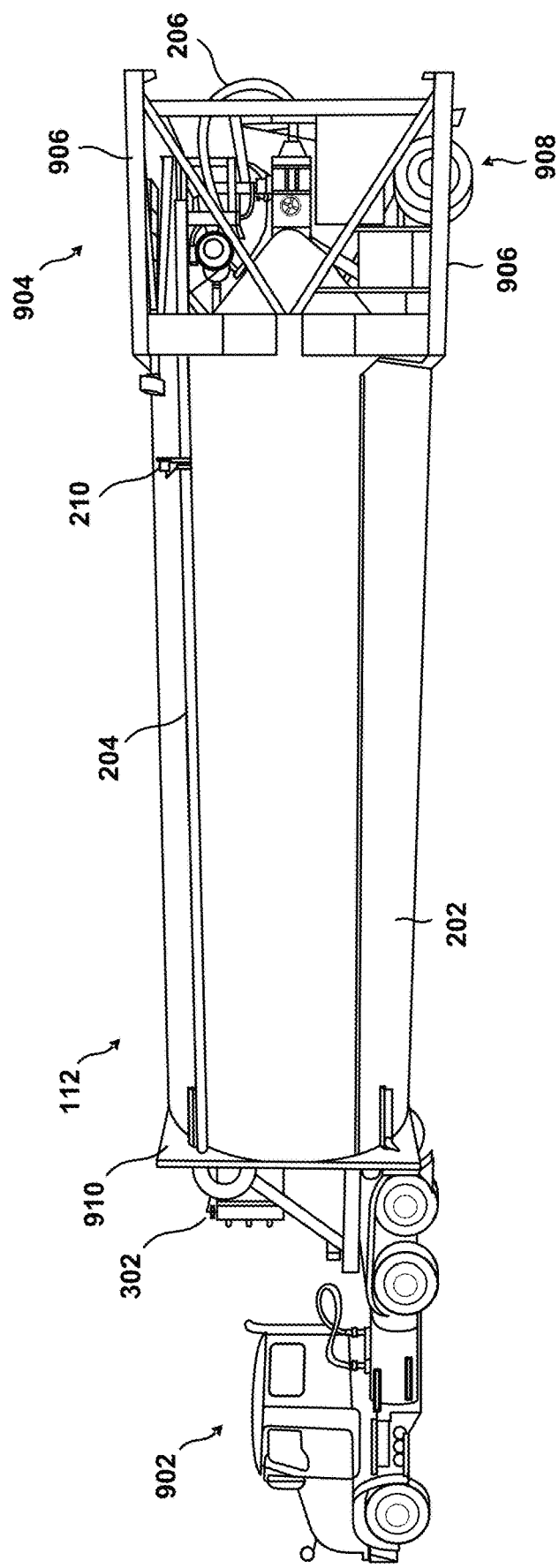
FIG. 9 is an illustration of a portable configuration of the silo system of FIG. 3A being hauled by a truck.
Figure 10:
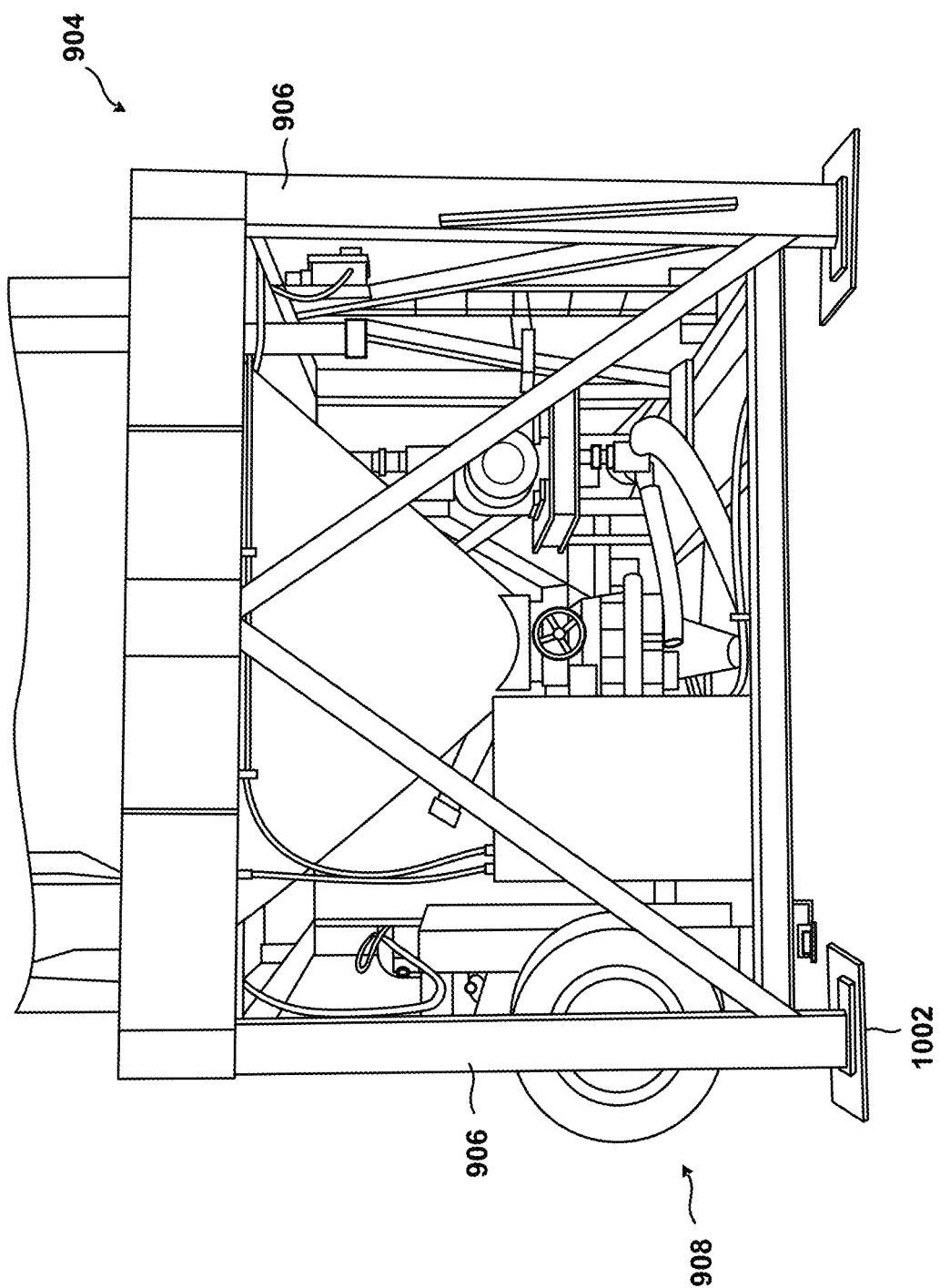
FIG. 10 is an illustration of the base structure of the portable silo system of FIG. 9 after installation on site.

FIG. 9 is an illustration of a portable configuration of the silo system 112 of FIG. 3A being hauled by a truck 902. FIG. 10 is an illustration of a base structure 904 of the portable silo system 112 of FIG. 9 after installation on site. The portable silo system 112 includes a base structure 904 having four legs 906 and an axel/wheel structure 908 spanning between two of the legs. The storage chamber 202 is integrated with and extends from the base structure 904. A platform 910 is located at the end/top of the storage chamber 202 and the baghouse 302 is secured to the platform. The platform 910 also includes a mechanism for hitching the portable silo system 112 to the truck 902. Other components of the silo system 112, including the intake pathway 204, the discharge pathway 206, the one or more material sensors, the plurality of actuators, and the controller are fixedly associated with either of the base structure or the storage chamber 202 to thereby enable portable transport of a fully assembled silo system.

Fixedly associated in this context may mean that a component is permanently coupled to the base structure 904 or the storage chamber 202 in a way that does not allow for removal without affecting the structural integrity of either the component or the base structure or storage chamber. For example, a component that is welded to the base structure is considered to be permanently coupled to the base structure because removal of the component would damage or deform both the component and the base structure. Fixedly associated in this context may mean that a component is removably coupled to the base structure 904 or the storage chamber 202 in a way that does allow for removal without affecting the structural integrity of either the component or the base structure or storage chamber. For example, a component that is bolted to the base structure is considered to be removably coupled to the base structure because removal of the component would not damage or deform either of the component are the base structure. Fixedly associated may also mean that a component is indirectly coupled, either permanently or removably, to the base structure 904 or the storage chamber 202 through an intervening component. For example, the pinch tube 210 is indirectly coupled to the storage chamber 202 through its association with the intake pathway 204.

Once located on site, the silo system 112 is positioned near an installation site and separated from the truck 902. The silo system 112 is then raised to a vertical position using a crane to place the legs 906 of the base structure 904 on a ground pad 1002. The legs 906 are then secured to the ground pad 1002 using bolts and other appropriate means. The silo system 112 is then coupled to the operational silo by connecting the discharge pathway 206 to an operational silo. Once the portable silo system 112 is no longer needed at the site, the system may be decoupled from the operational silo, separated from the ground pad 1002, moved to a horizonal position using a crane, hitched to a truck 902 and then transported to a different location or site.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A bulk material management system for use with a first silo storing a material, the system comprising:

one or more material sensors for sensing material in the first silo and generating real-time material data relating to the material in the first silo;

a plurality of verification sensors for sensing one or more of the first silo or a transport container, and for generating real-time verification data for confirming at least one of an arrival of the transport container to a proximity of the first silo, a material delivery by the transport container to the first silo, or a deposit of additional material from the transport container into the first silo;

a processor for receiving the material data and the verification data, and for generating a confirmation of any combination of the arrival of the transport container to the proximity of the first silo, the material delivery by the transport container to the first silo, or the deposit of the additional material from the transport container into the first silo; and a communication interface communicatively coupled to the processor for communicating the confirmation to an application server.

2. The bulk material management system of claim 1, wherein:
the deposit of the additional material from the transport container into the first silo is through an intake pathway between the transport container and the first silo;
the plurality of verification sensors comprises a power take-off (PTO) engagement sensor for sensing a PTO associated with the transport container; and
the verification data comprises one or more of:
an engagement or a disengagement of the PTO; or
an on-state or an off-state of a blower powered by the PTO and coupled to the intake pathway.

3. The bulk material management system of claim 1, wherein:
at least one of the material sensors or the verification sensors comprises a weight sensor for sensing a weight of the material in the first silo; and
the material data or the time verification data comprises one or more of:
an amount of an increase in the weight of the material in the first silo coinciding with the material delivery by the transport container; or
comparison information between the increase in the weight of the material and a predetermined weight corresponding to the additional material carried by the transport container.

4. The bulk material management system of claim 1, wherein:
the plurality of verification sensors comprises a proximity sensor for generating real-time proximity information relating to a proximity of the transport container to the first silo; and
the processor is configured to confirm the arrival of the transport container to the proximity of the first silo based on the proximity information.

5. The bulk material management system of claim 1, further comprising:
one or more intake actuators for enabling the deposit of the additional material from the transport container into the first silo through an intake pathway; and
one or more discharge actuators for enabling a material discharge from the first silo through a discharge pathway into a second silo,
wherein the processor is configured to control the one or more intake actuators and the one or more discharge actuators in response to at least one of the material data or the verification data.

6. The bulk material management system of claim 5, wherein the processor is further configured to enable through the control of the one or more intake actuators and the one or more discharge actuators, the deposit of the additional material into the first silo through the intake pathway that is at least partially simultaneous with the material discharge from the first silo through the discharge pathway.

7. The bulk material management system of claim 1, wherein the processor is configured for generating the confirmation based on a combination of two or more of:
a proximity of the transport container to the first silo;
an engagement or a disengagement of a power take-off (PTO) associated with the transport container;
a duration of the engagement of the PTO;
an on-state or an off-state of a blower powered by the PTO;
a duration of the on-state of the blower;
an amount of an increase in weight of the material in the first silo coinciding with the material delivery by the transport container;
comparison information between the increase in the weight of the material and a predetermined weight corresponding to the additional material carried by the transport container;
fill level information relating to a level of the material in the first silo; or
pressure information relating to an air pressure in the first silo.

8. The bulk material management system of claim 2, wherein the verification data further comprises one or more of:
a duration of the on-state of the blower; or
a duration of the engagement of the PTO.

9. The bulk material management system of claim 4, wherein the proximity sensor comprises one or more of:
a radio frequency identification (RFID) sensor for sensing an RFID tag associated with the transport container;
a global positioning system (GPS) sensor for sensing a location of the transport container.

* * * * *